US011377354B2

(12) United States Patent
Moore et al.

(10) Patent No.: US 11,377,354 B2
(45) Date of Patent: Jul. 5, 2022

(54) CARBON NANOTUBE GROWTH METHOD

(71) Applicant: The Aerospace Corporation, El Segundo, CA (US)

(72) Inventors: Teresa A. Moore, El Segundo, CA (US); Brian B. Brady, Seal Beach, CA (US); Robert B. Driscoll, El Segundo, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 256 days.

(21) Appl. No.: 16/570,385

(22) Filed: Sep. 13, 2019

(65) Prior Publication Data
US 2021/0078862 A1  Mar. 18, 2021

(51) Int. Cl.
*C01B 32/16* (2017.01)

(52) U.S. Cl.
CPC .......... *C01B 32/16* (2017.08); *C01B 2202/30* (2013.01); *C01P 2002/85* (2013.01); *C01P 2004/03* (2013.01); *C01P 2004/04* (2013.01)

(58) Field of Classification Search
CPC . C01B 32/16; C01B 2202/30; C01B 2202/06; C01P 2004/04; C01P 2002/85; C01P 2004/03
See application file for complete search history.

(56) References Cited

U.S. PATENT DOCUMENTS

2005/0079119 A1\* 4/2005 Kawakami ............. B82Y 30/00
423/447.3

FOREIGN PATENT DOCUMENTS

WO WO-2014202740 A1 \* 12/2014 ............. C01B 32/16

OTHER PUBLICATIONS

Kong, Jing, Alan M. Cassell, and Hongjie Dai. "Chemical vapor deposition of methane for single-walled carbon nanotubes." Chemical physics letters 292.4-6 (1998): 567-574.\*
Jung, Bin. Reliable Growth of Vertically Aligned Carbon Nanotube Arrays by Chemical Vapor Deposition and In-situ Measurement of Fundamental Growth Kinetics in Oxygen-free Conditions. Diss. University of California, Berkeley, 2011.\*
Snoeck, J-W., G. F. Froment, and M. Fowles. "Kinetic study of the carbon filament formation by methane cracking on a nickel catalyst." Journal of Catalysis 169.1 (1997): 250-262.\*
Hong, Nguyen Tuan, et al. "Combined model for growing mechanism of carbon nanotubes using HFCVD: effect of temperature and molecule gas diffusion." Thin Solid Films 517.12 (2009): 3562-3565.\*
Chen, Zhongming, et al. "Over 99.6 wt%-pure, sub-millimeter-long carbon nanotubes realized by fluidized-bed with careful control of the catalyst and carbon feeds." Carbon 80 (2014): 339-350.\*
Zhang, You, et al. "Preparation of carbon nanospheres by non-catalytic chemical vapor deposition and their formation mechanism." New Carbon Materials 31.5 (2016): 467-474.\*

(Continued)

*Primary Examiner* — Richard M Rump
(74) *Attorney, Agent, or Firm* — LeonardPatel PC

(57) ABSTRACT

A process for growing carbon nanotubes includes making carbon nanotubes by flowing methane into a tube. The process also includes increasing pressure to a high predefined pressure for the carbon nanotubes and maintaining temperature at a low predefined temperature for the carbon nanotubes. The high pressure and low temperature produce carbon nanotubes within minutes.

13 Claims, 13 Drawing Sheets

(56) References Cited

OTHER PUBLICATIONS

Schneider, Jörg J., et al. "Catalyst free growth of a carbon nanotube-alumina composite structure." Inorganica Chimica Acta 361.6 (2008): 1770-1778.*

Steiner III, Stephen A., et al. "Nanoscale zirconia as a nonmetallic catalyst for graphitization of carbon and growth of single-and multiwall carbon nanotubes." Journal of the American Chemical Society 131.34 (2009): 12144-12154.*

Antoinette, et al., "Building a World Impact Business on Carbon Nano Tubes", Nanocomp, Amsterdam, Dec. 13, 2016.

* cited by examiner

300

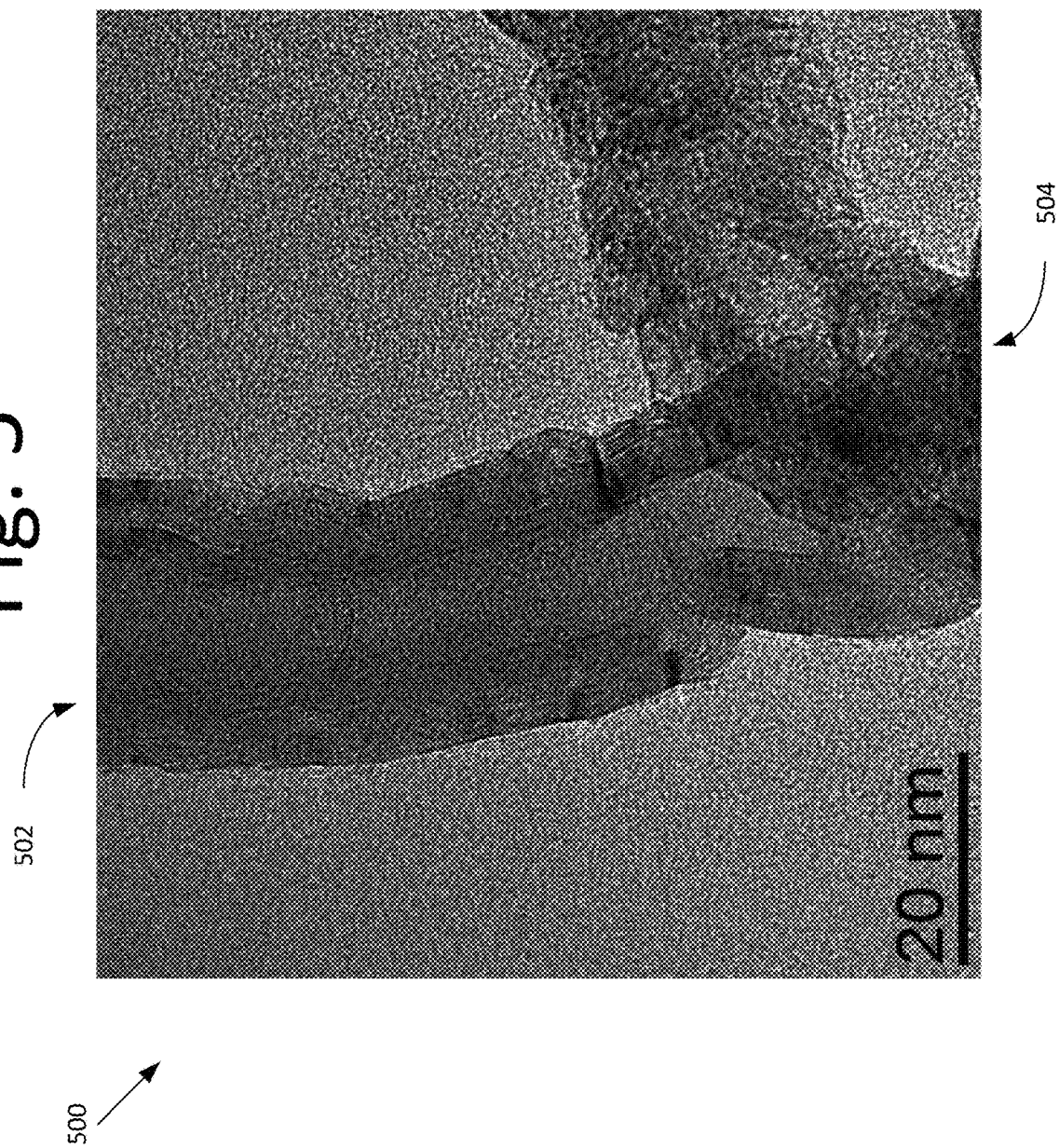

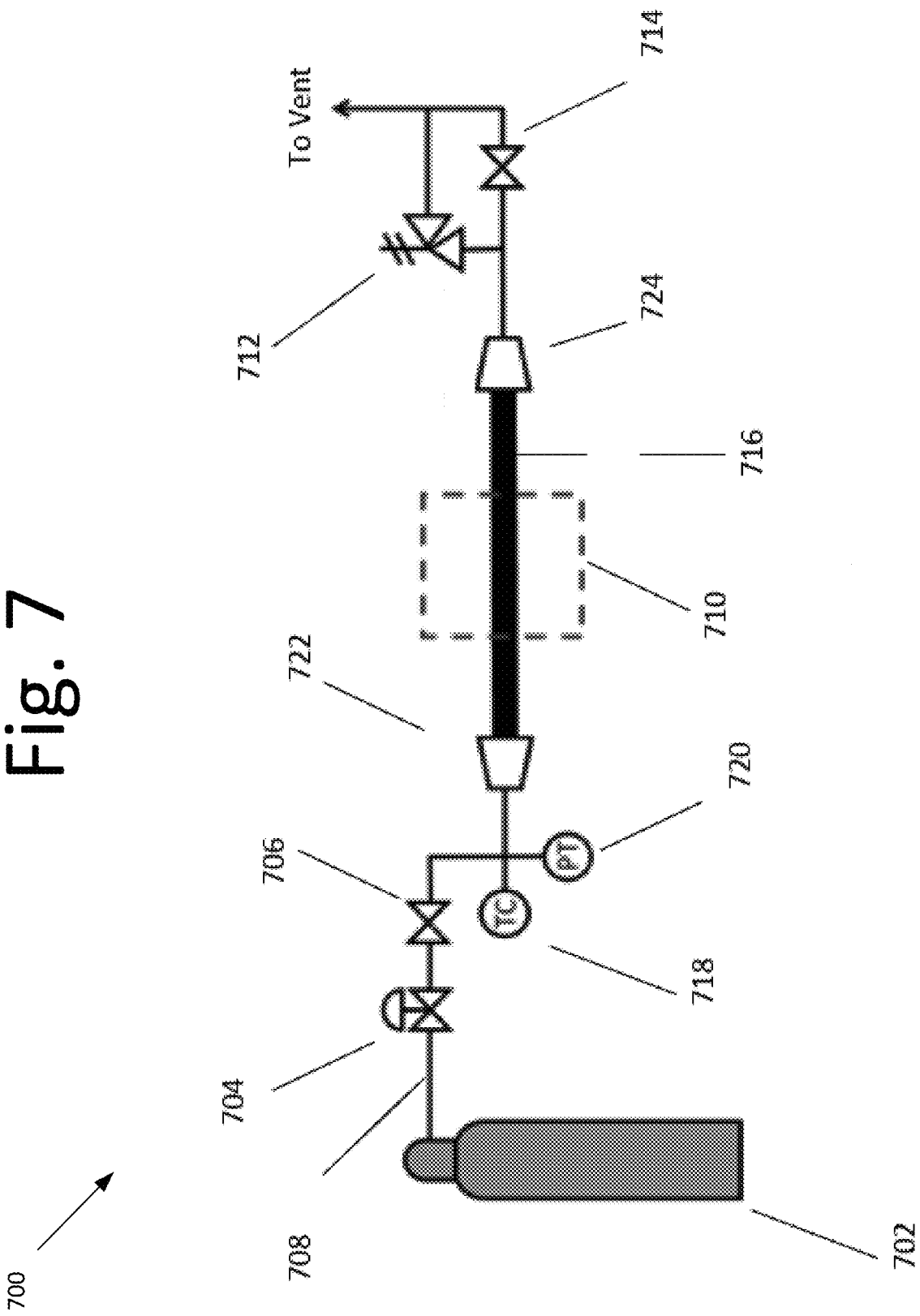

800(c)

800(d)

800(e)

CARBON NANOTUBE GROWTH METHOD

STATEMENT OF GOVERNMENT INTEREST

This invention was made with government support under Contract No. FA8802-19-C-0001. The government has certain rights in the invention.

FIELD

The present invention relates to carbon nanotubes, and more particularly, to a method of growing carbon nanotubes.

BACKGROUND

Carbon nanotubes are generally grown in a continually running furnace at atmospheric pressure (~15 psi) and at high temperatures (~1,700 degrees Celsius). Growing carbon nanotubes with the conventional process may expose the carbon nanotubes to contamination. Conventionally grown nanotubes contain metal particles, and particularly left-over iron catalyst. Recent work at Rice University showed that the presence of contaminants, such as iron, carbon, and water, lead to inconsistent results when measuring nanotube conductivity. Clean tubes with consistent properties are important to any application. In addition, iron particles have magnetic properties that limit the application of contaminated nanotubes where magnetic fields are present. Furthermore, several applications of carbon nanotubes involve mixing them into another material to provide additional strength or conductivity to that material. Conventional carbon nanotubes, which are straight, have a low coefficient of friction and slide out of the material they are embedded in under stress.

Thus, an alternative process for growing carbon nanotubes may be more beneficial.

SUMMARY

Certain embodiments of the present invention may provide solutions to the problems and needs in the art that have not yet been fully identified, appreciated, or solved by current technologies for growing carbon nanotubes. For example, some embodiments generally pertain to growing carbon nanotubes at high pressure and cooler temperatures.

In an embodiment, a process for growing carbon nanotubes includes making carbon nanotubes by flowing pressurized methane through a heated tube. The process includes using higher pressures than the usual carbon nanotube growth methods (e.g. between 3000 and 5000 psi) and lower tube temperatures than the usual carbon nanotube growth methods (e.g. between 600 and 800° C.) The high pressure and low temperature produce carbon nanotubes within minutes.

In another embodiment, a process for growing carbon nanotubes includes filling a tube with a methane-based mixture, increasing the pressure to a high predefined pressure, and increasing the temperature to a pre-defined temperature between 600 and 800° C.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 5 is a TEM image illustrating a carbon nanotube, according to an embodiment of the present invention.

FIG. 7 is a diagram illustrating a carbon nanotube growth apparatus, according to an embodiment of the present invention.

DETAILED DESCRIPTION OF THE EMBODIMENTS

Some embodiments pertain to a method for growing carbon nanotubes to generate highly curved or coiled carbon nanotubes. The coiling increases the coefficient of friction and allows the carbon nanotubes to catch on each other like nano-Velcro. Also, it is known that the coiling is achieved by a change in molecular orbitals involved in bonding. Conventional carbon nanotubes bond through sp2 hybridized orbitals, the same orbitals used by graphite. These orbitals are planar and generate flat sheets of atoms, or the gently curved surface that wraps around to form a conventional carbon nanotube. Highly curved or coiled carbon nanotubes, ones which change direction in a distance on the order of the carbon nanotube radius, use sp3 molecular orbitals. These orbitals are more reactive and allow the carbon nanotubes to be functionalized or cross-linked. This additional bonding will enable the carbon nanotubes to bond more strongly to each other or to the matrix into which they are embedded.

Some embodiments pertain to the growth of carbon nanotubes under high pressure (e.g., pressure greater than 3,000 psi) and cooler temperatures (e.g., at or around 750 degrees Celsius) from pure methane or a mixture of methane and light hydrocarbons. The high pressure, high density growth regime may create carbon nanotubes with unique properties compared to those grown with conventional (low pressure) growth methods.

In some embodiments, the high pressure growth environment may produce carbon nanotubes quicker (e.g., in 3 to 6 minutes) and may significantly improve the rate of production of the carbon nanotubes over other production methods. For example, current bulk production methods are plagued with contamination of metal catalysts. The high pressure method discussed herein may produce carbon nanotubes without metal contamination, or with low metal contamination.

Figure 1:
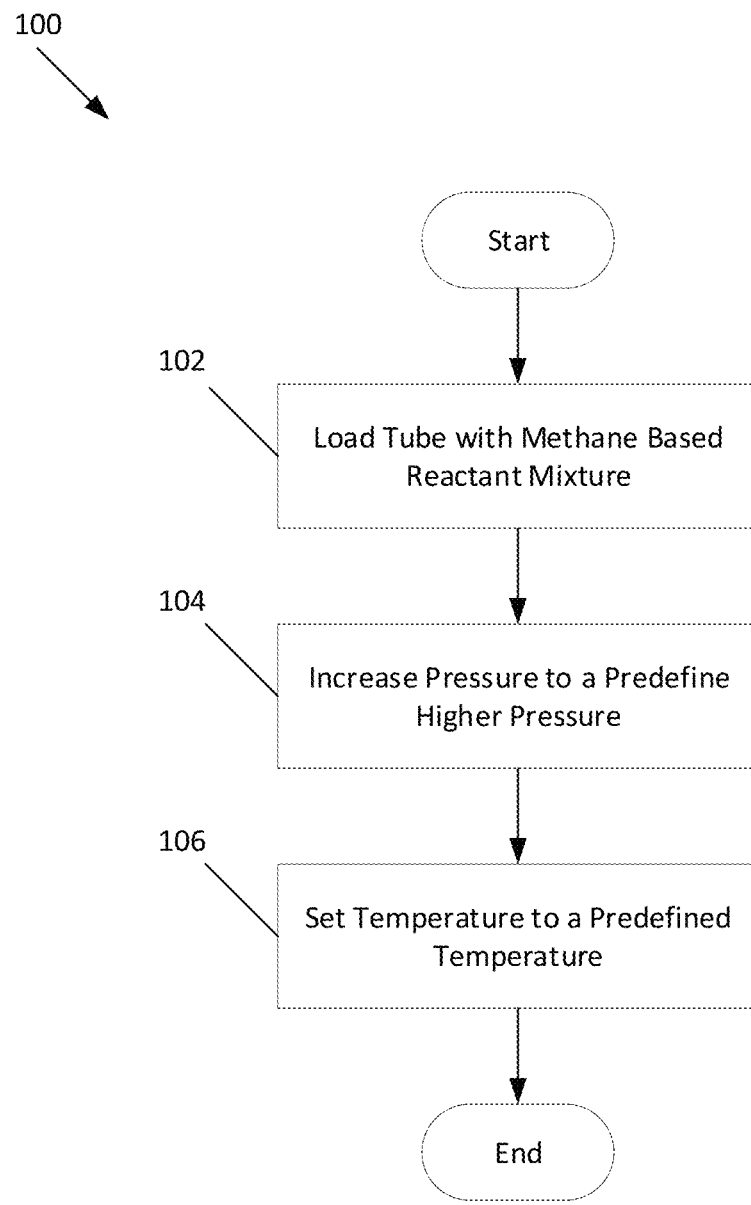
FIG. 1 is a flow diagram illustrating a process for growing carbon nanotubes, according to an embodiment of the present invention.

FIG. 1 is a flow diagram illustrating a process 100 for growing carbon nanotubes, according to an embodiment of the present invention. In an embodiment, the process may begin at 102 with loading a tube furnace with methane-based reactant mixture. For example, carbon nanotubes are made from pure methane or a mixture of methane and light hydrocarbons. See, for example, FIG. 7, which is a diagram illustrating a carbon nanotube growth apparatus 700, according to an embodiment of the present invention. Returning to FIG. 1, a methane-based reaction mixture is loaded into a sealed tube in a tube furnace. At 104, the reactant pressure is adjusted to a pressure that, when heated, increases pressure anywhere between 3000 and 5000 psi. At 106, the furnace is then turned on and the tube is heated to a temperature between 600 and 800 degrees Celsius. Note that the temperature is generally cooler than conventional carbon nanotube growing processes.

By using higher pressure than the conventional methods, the carbon nanotubes are grown at a faster rate, e.g., within 3 to 5 minutes. In some embodiments, pressure may be set between 3000 to 5000 psi. Also, by using lower temperature, the carbon nanotubes may include fewer impurities than those grown using conventional methods. For example, in commercial carbon nanotubes, the concentration of impurities vary by the metal (e.g., cobalt, nickel and molybdenum range from about 0.5% to 3%). Some embodiments may achieve lower levels of impurities than those in commercial carbon nanotubes. Also, in some embodiments, the lower temperature may be set between 600 to 800 degrees Celsius. Outlet fluid may be used in some embodiments. In those embodiments, the outlet fluid temperature may be set to 400 degrees Celsius to 650 degrees Celsius.

In some embodiments, the propane mole fraction may be set anywhere between 0.0 to 0.25 (e.g., ~4.5 percent propane). For example, light hydrocarbons, such as ethylene, ethane, propane, or butane, are added to, or are already present, in the methane-based reactant mixture. These additives further lower the temperature of carbon nanotube formation and growth, and lead to broader coverage of the carbon nanotube growth template. It should be appreciated that higher nominal propane concentrations produced carbon nanotubes at a lower thickness over a larger area. It some cases, the thickness of the carbon nanotube layer was approximately 179 nm for a three-minute test run. However, it should be appreciated that the thickness may vary depending on the embodiment.

Figure 2:
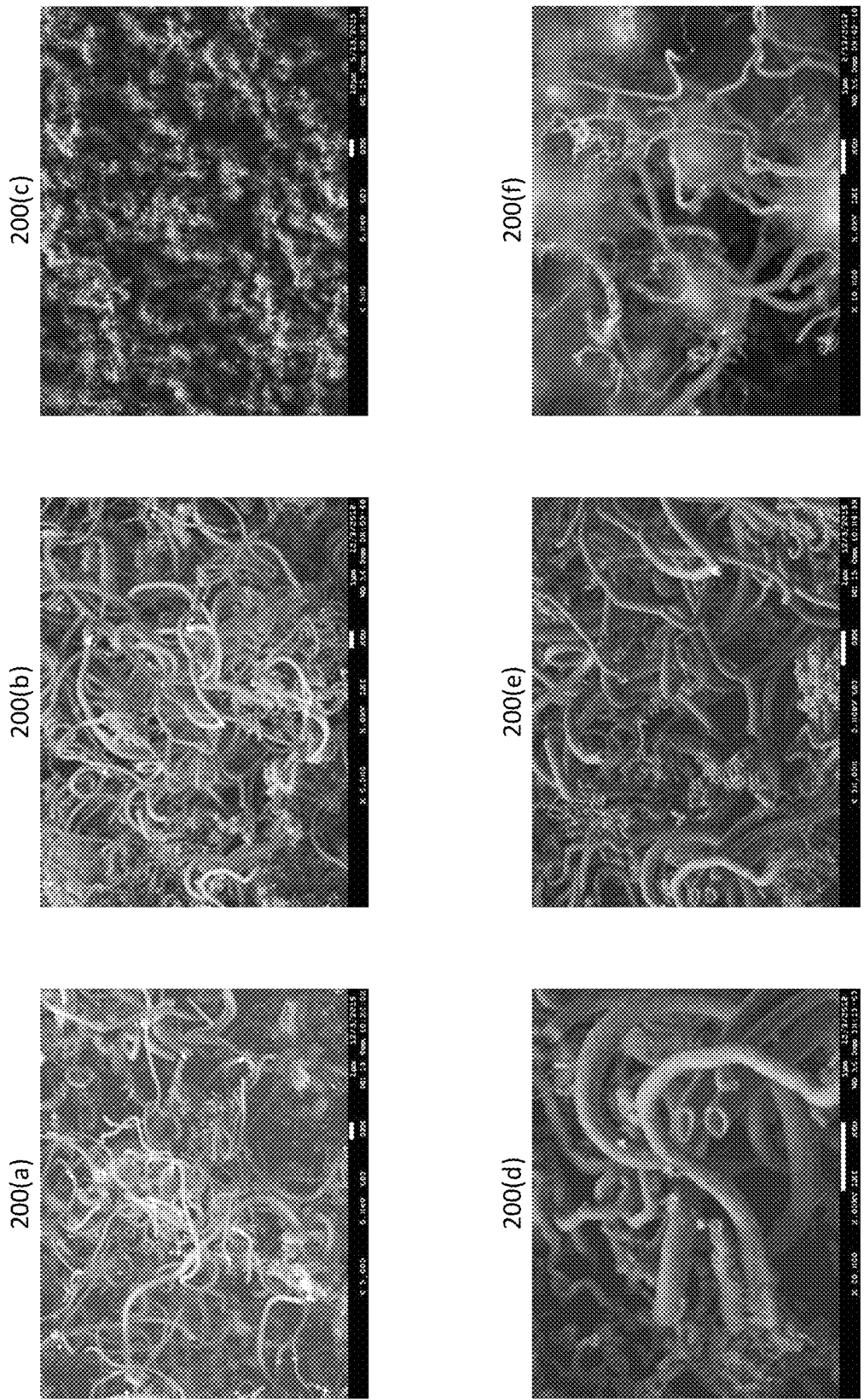
FIG. 2 are SEM images illustrating the carbon nanotubes, according to an embodiment of the present invention.

FIG. 2 are SEM images 200(a)-200(e) illustrating the carbon nanotubes, according to an embodiment of the present invention. In particular, SEM images 200(a)-200(e) illustrate the carbon nanotubes grown in this embodiment under several different magnifications. The lowest magnification (e.g., at 500× such as that shown in SEM image 200(c)) shows a large extent of the mat of carbon nanotubes is formed. At 5,000× (see, for example, SEM images 200(a) and 200(b)), the carbon nanotubes are seen to be curled and intertwined. At 10,000×, (see SEM images 200(e) and 200(f), there appears to be several different sizes and structures of the carbon nanotubes. Of particular note, e.g., as shown in SEM images (c) and (f), are the coiled carbon nanotubes with a radius of curvature similar to the diameter of the carbon nanotube. These carbon nanotubes have special properties. At the highest magnification (e.g., 20,000× such as that shown in SEM image 200(d)), the openings on the ends of the carbon nanotubes are visible confirming that these are hollow tubes.

Figure 3:
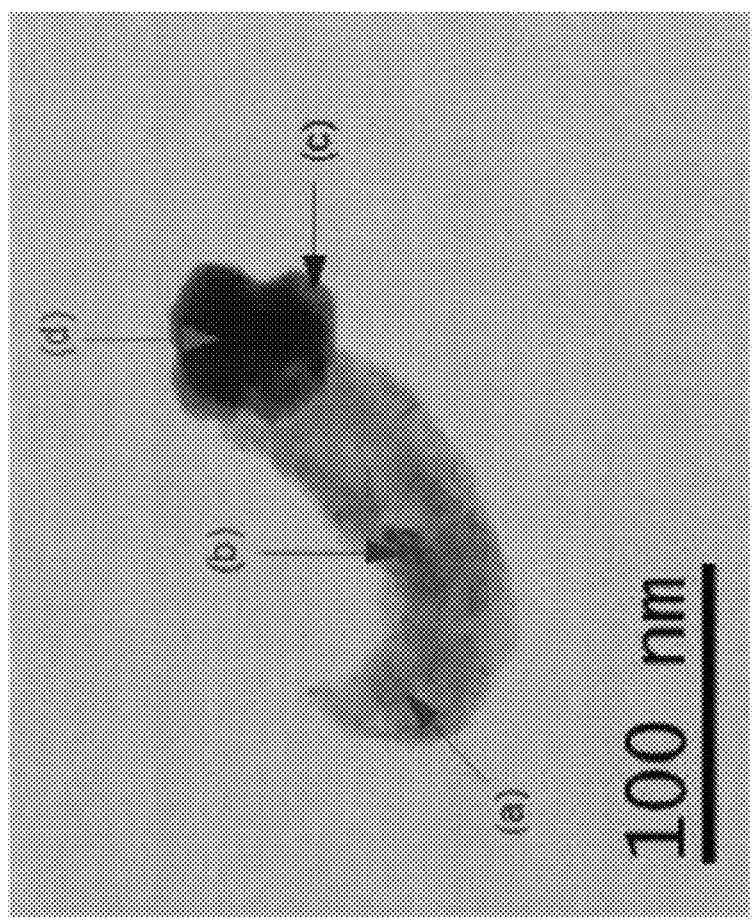
FIG. 3 is an image illustrating a carbon nanotube, according to an embodiment of the present invention.

FIG. 3 is an image 300 illustrating a carbon nanotube, according to an embodiment of the present invention. In this embodiment, image 300 shows areas with only carbon (a) or thick areas of carbon (b), as well as iron-oxide (c) or (d), which are external to the carbon nanotube.

Figure 4:
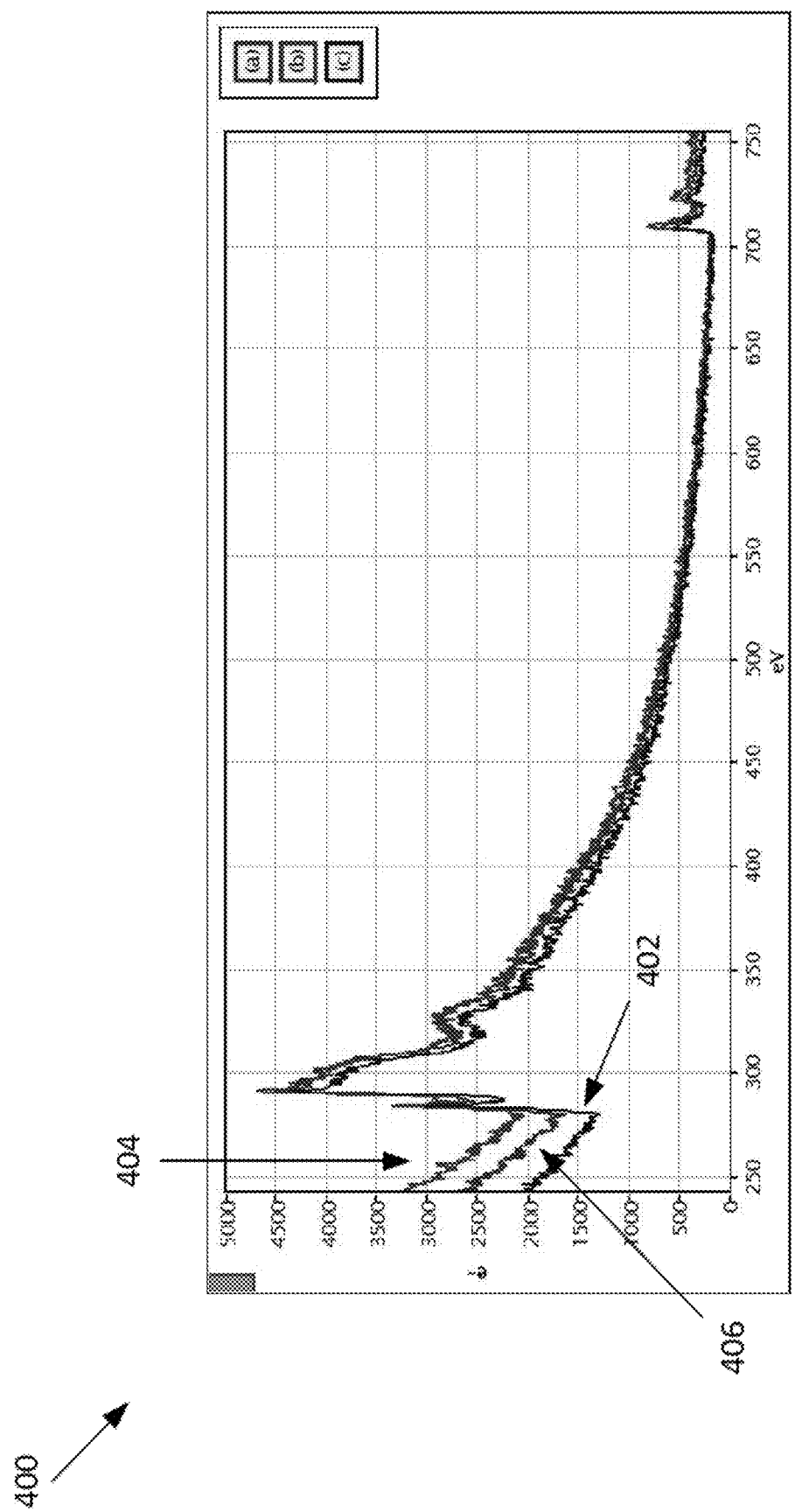
FIG. 4 is a graph illustrating Energy Dispersive X-ray Spectroscopy (EDS) of several carbon nanotubes, according to an embodiment of the present invention.

FIG. 4 is a graph 400 illustrating an energy dispersive x-ray spectroscopy of several carbon nanotubes, according to an embodiment of the present invention. Graph 400 shows energy dispersive x-ray spectroscopy (EDS) of three carbon nanotubes, labeled 402, 404 and 406. The EDS spectrum gives chemical composition. The peak and sideband at ~300 eV show the presence of carbon, and the peaks between 700 and 750 eV are from iron. The lack of other peaks shows these are the only two chemical elements present in the nanotube.

FIG. 5 is a TEM image 500 illustrating a carbon nanotube, according to an embodiment of the present invention. In TEM image 500, the lines at the edge of the carbon nanotubes are from the walls of the multiwalled carbon nanotube. Where lines 502 are straight and parallel, just left of center and toward the top of the image, those lines indicate conventional straight multiwalled carbon nanotubes. Where lines 504 change direction multiple times in a span similar to the width of the carbon nanotube, bottom right of image, those lines indicate carbon nanotubes with a high degree of curvature.

Figure 6A:
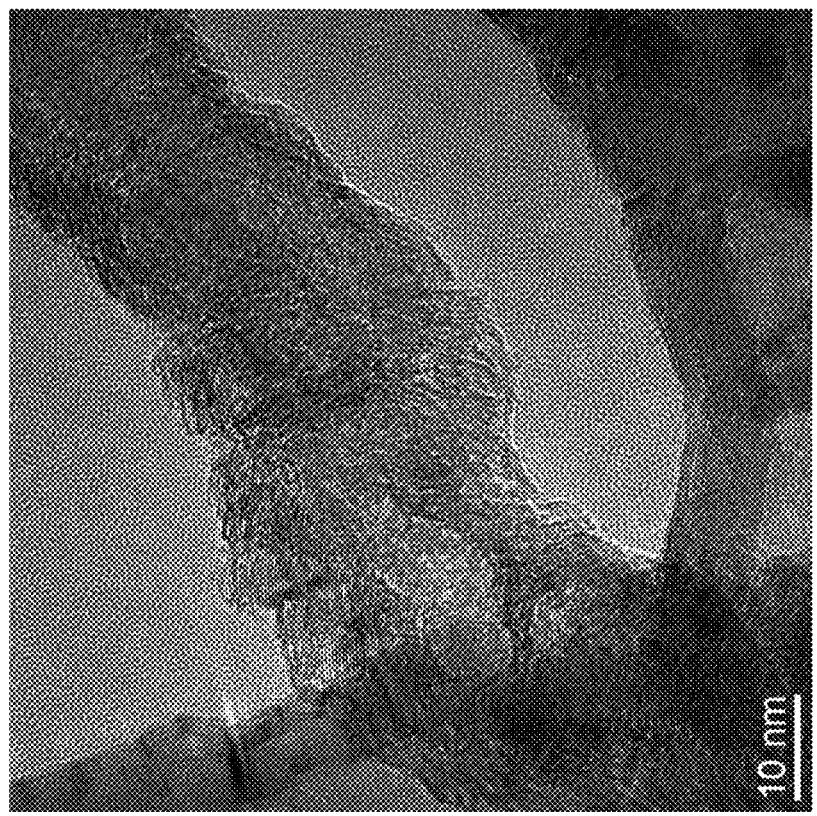
FIGS. 6A and 6B are TEM images illustrating a carbon nanotube, according to an embodiment of the present invention.
Figure 6B:
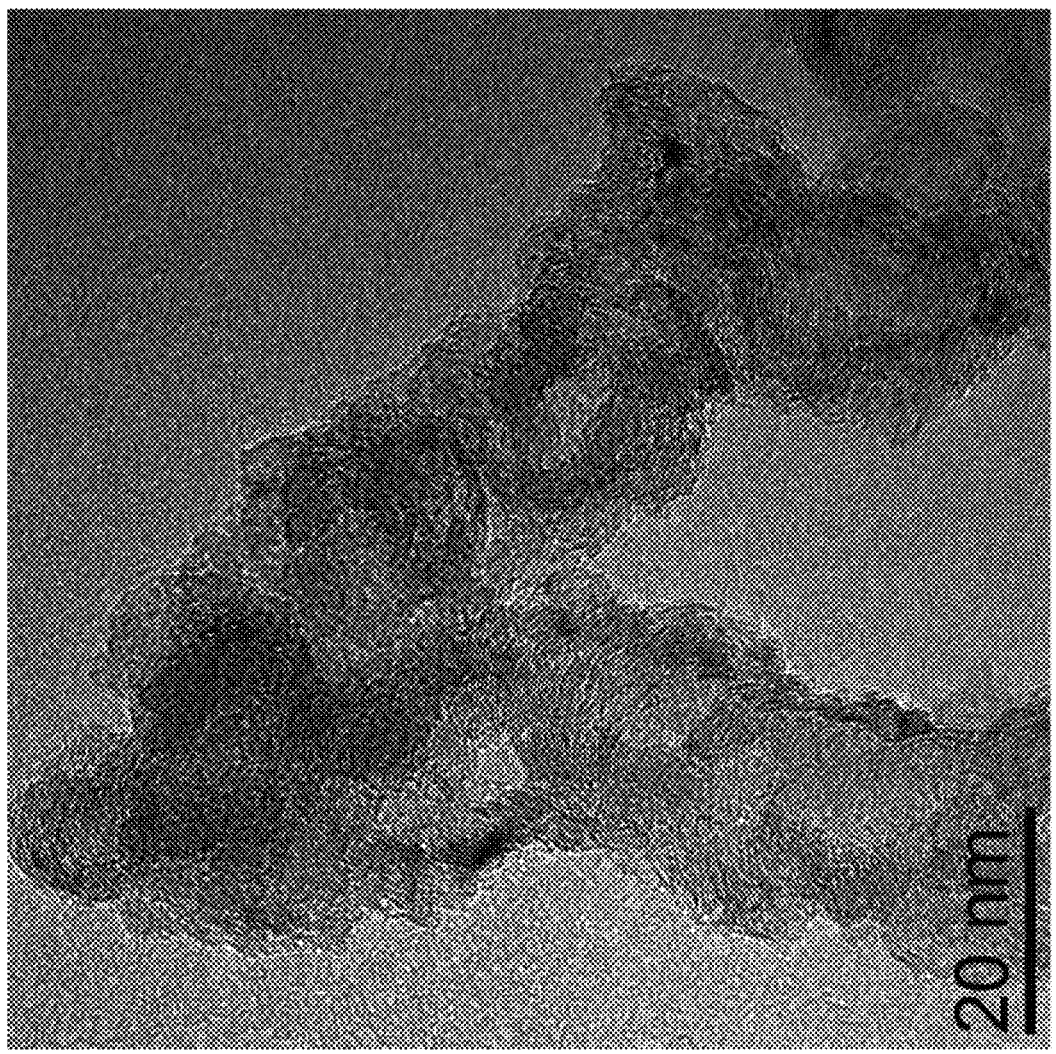
Figure 8A:
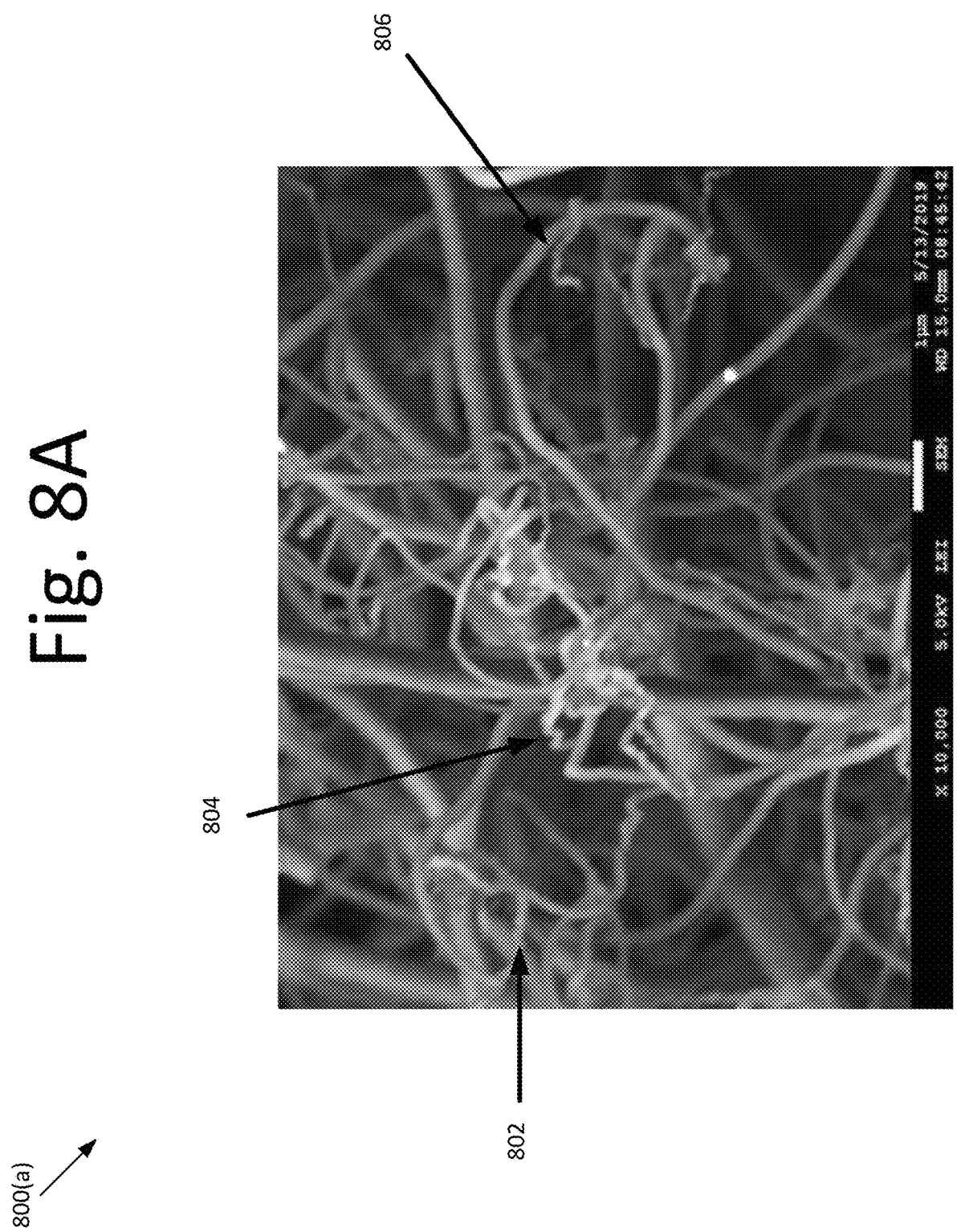
FIG. 8A-E are SEM images illustrating highly curved or coiled carbon nanotubes, according to an embodiment of the present invention.
Figure 8B:
Figure 8C:
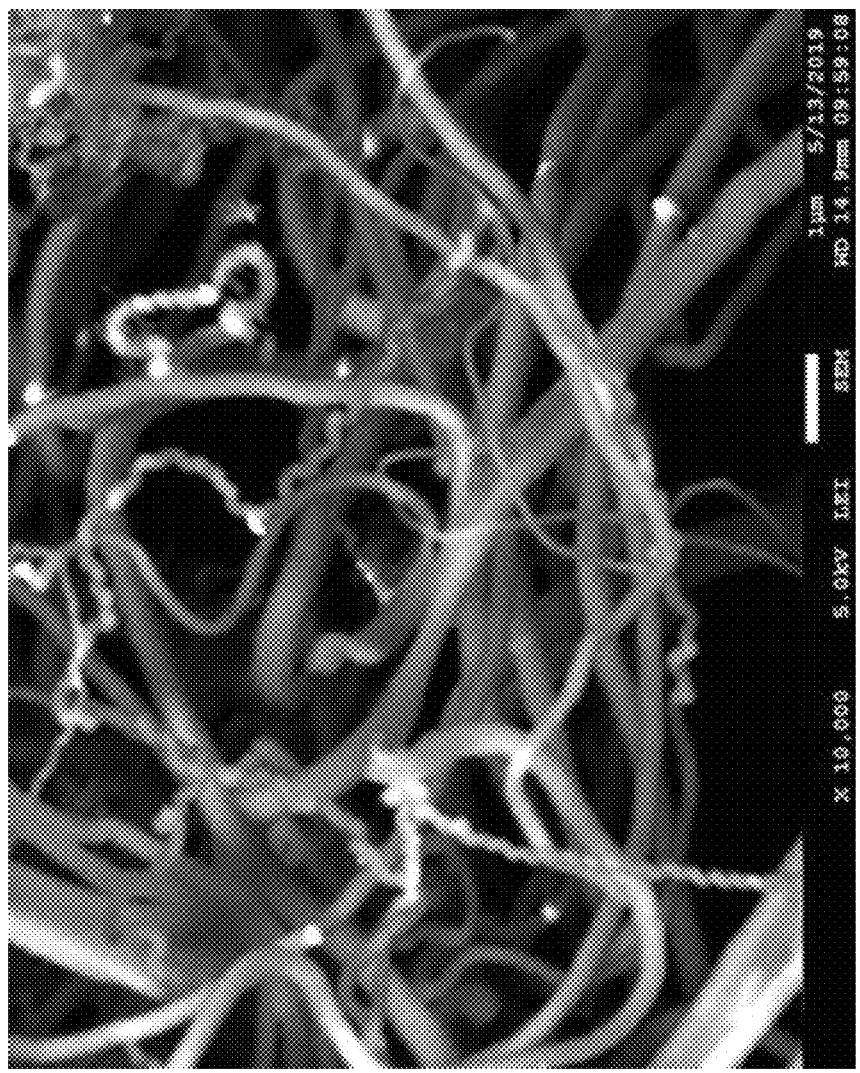
Figure 8D:
Figure 8E:
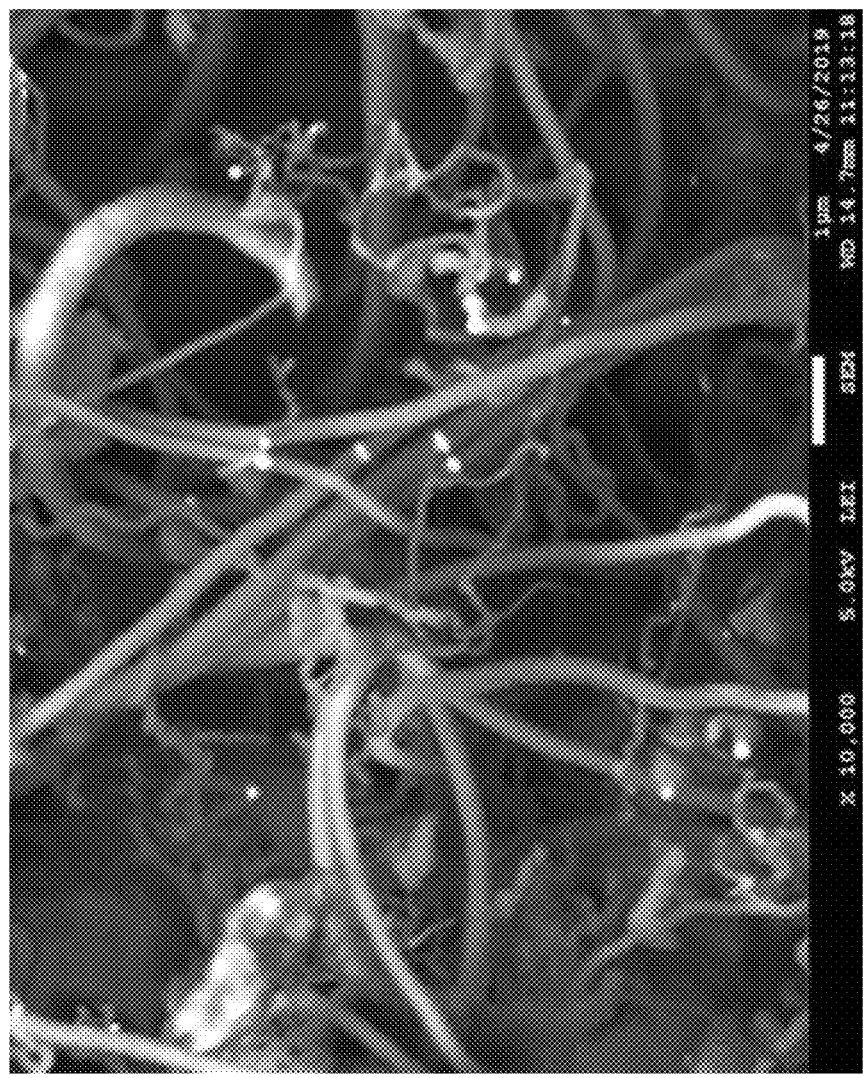

FIGS. 6A and 6B are TEM images 600(a) and 600(b) illustrating a carbon nanotube, according to an embodiment of the present invention. TEM images 600(a) and 600(b) are similar to that of TEM image 500 in FIG. 5. However, TEM images 600(a) and 600(b) show a longer section of a highly curved carbon nanotube running from the lower left corner of TEM images 600(a) and 600(b) to the upper right.

FIG. 7 is a diagram illustrating a carbon nanotube growth apparatus 700, according to an embodiment of the present invention. In this embodiment, a container 702, which includes the desired gas mixture, is connected to a regulator 704. Regulator 704 is set to a desired pressure. When manual valve 706 is opened, tube 708 and reactor tube 716 are pressurized to the desired pressure. In some embodiments, tube 708 is a ¼" tubing connected to reactor tube 716. Reactor tube 716, part of which is covered by tube heater 710, is approximately 1" in diameter. A tube heater 710 heats both tube 716 and the gas inside of tube 716 to the desired temperature.

A relief valve 712 is attached for safety. After the preset reaction time, a second manual valve 714 is opened, venting the remaining gas. The carbon nanotubes can then be collected from the wall of reactor tube 716, or a substrate placed in tube 708 prior to pressurizing with gas.

Although not discussed here in detail, carbon nanotube growth apparatus 700 includes thermocouple 718, pressure gauge 720, and a first reducer 722 and a second reducer 724. In some embodiments, thermocouple 718 and pressure gauge 720 are used for diagnostic purposes to assess the progress of carbon nanotube formation. First reducer 722 and second reducer 724 adapt carbon nanotube formation tube 716 to supply and vent tubes 708, respectively.

FIG. 8A-E are SEM images 800(a) to 800(e) illustrating highly curved or coiled carbon nanotubes, according to an embodiment of the present invention. FIGS. 8A-E showed carbon nanotubes formed from an embodiment. Arrows 802, 804 and 806 in FIG. 8A point to highly coiled carbon nanotubes. In FIGS. 8B to 8E, images 800(b) to 800(e) show additional highly coiled carbon nanotubes from other tests. These images 800(a)-800(e) show that the formation of this type of carbon nanotube is consistent when using the process for growing the carbon nanotubes.

In an embodiment, a process for growing carbon nanotubes includes making the carbon nanotubes by flowing methane into a tube. The process also includes increasing pressure to a high predefined pressure for the carbon nanotubes, and maintaining temperature at a low predefined temperature for the carbon nanotubes. The high pressure and low temperature produce the carbon nanotubes within minutes.

In some embodiments, the predefined pressure is set between 3,000 psi and 5,000 psi, and the predefined temperature is set between 600 degrees Celsius and 800 degrees Celsius.

In certain embodiments, the making of the carbon nanotubes includes flowing of the methane or a mixture of methane and light hydrocarbons in the tube. In an embodiment, the light hydrocarbons include ethylene, ethane, propane, or butane, or any combination thereof, at the predefined pressure, thereby producing the carbon nanotubes at a lower temperature than those produced with methane alone.

In a further embodiment, the process includes loading the methane or the mixture into a sealed tube in a tube furnace.

It should be appreciated that the carbon nanotubes are grown within minutes is between three and five minutes.

In some embodiment, a propane mole fraction of the methane is set between 0.0 to 0.25.

In another embodiment, a carbon nanotube growth apparatus includes a reactor tube operatively connected to a container comprising a gas mixture via a tube, wherein the tube supplies the gas mixture from the container to the reactor tube. When a manual valve is opened, the tube and the reactor tube are pressurized to a predefined pressure, and a tube heater surrounding a portion of the reactor tube heats the reactor tube and the gas mixtures within the reactor tube to a predefined temperature. The pressurization of the tube and the reactor tube and the heating of the reactor tube and the gas mixture within the reactor tube allows for carbon nanotubes to be formed within the reactor tube.

In some embodiments, the predefined pressure is greater than 3,000 psi, and the predefined pressure is between 600 and 800 degrees Celsius. Further, the pressurization and the heating produce the carbon nanotubes within three to six minutes.

In some embodiments, the gas mixture includes light hydrocarbons to lower the temperature of the carbon nanotube formation and growth. In an embodiment, the light hydrocarbon includes a propane mole fraction of 4.5 percent propane, and the produced carbon nanotubes comprise impurity concentration levels of less than 0.5 percent.

In yet another embodiment, a process for growing carbon nanotubes includes growing the carbon nanotubes within a reactor tube at a pressure greater than 3,000 psi and at temperature less than or equal to 750 degrees Celsius. The carbon nanotubes are grown from pure methane or a mixture of methane and light hydrocarbons.

In some embodiments, the growing of the carbon nanotubes are achieved within three to six minutes. Further, the carbon nanotubes include little to no metal contamination, e.g., an impurity concentration level in a metal being less than 0.5 percent. The carbon nanotubes may also include a layer thickness of 179 nm or a layer thickness of greater than 179 nm.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A process for growing carbon nanotubes, comprising:
   making the carbon nanotubes by flowing methane into a tube;
   increasing pressure to a predefined pressure for the carbon nanotubes; and
   maintaining temperature at the predefined temperature for the carbon nanotubes without use of a dedicated metal catalyst, wherein
   the predefined pressure and predefined temperature produce the carbon nanotubes within minutes, and
   the predefined pressure is greater than or equal to 1000 psi and the predefined temperature is less than or equal to 800 degrees C.

2. The process of claim 1, wherein the predefined pressure is set between 3,000 psi and 5,000 psi.

3. The process of claim 1, wherein the predefined temperature is set between 600 degrees Celsius and 800 degrees Celsius.

4. The process of claim 1, wherein the making of the carbon nanotubes comprising flowing of the methane or a mixture of methane and light hydrocarbons in the tube.

5. The process of claim 4, wherein the light hydrocarbons comprise ethylene, ethane, propane, or butane, or any combination thereof, at the predefined pressure, thereby producing the carbon nanotubes at a lower temperature than those produced with methane alone.

6. The process of claim 4, further comprising:
loading the methane or the mixture into a sealed tube in a tube furnace.

7. The process of claim 1, wherein the producing the carbon nanotubes within minutes is between three and five minutes.

8. The process of claim 1, wherein a propane mole fraction of the methane is set between 0.0 to 0.25.

9. A process for growing carbon nanotubes, comprising:
growing the carbon nanotubes within a reactor tube without use of a dedicated metal catalyst at a pressure greater than 3,000 psi and at temperature less than or equal to 750 degrees Celsius, wherein
the carbon nanotubes are grown from pure methane or a mixture of methane and light hydrocarbons.

10. The process of claim 9, wherein the growing of the carbon nanotubes are achieved within three to six minutes.

11. The process of claim 9, wherein the carbon nanotubes comprise no metal contamination or low metal contamination, the low metal contamination comprising an impurity concentration level in a metal being less than 0.5 percent.

12. The process of claim 9, wherein the carbon nanotubes comprise a layer thickness of 179 nm.

13. The process of claim 9, wherein the carbon nanotubes comprise a layer thickness of greater than 179 nm.

* * * * *